United States Patent Office 3,308,161
Patented Mar. 7, 1967

3,308,161
ALKALI METAL-DIMETHYL DODECYL AMINE SALTS OF OXYACIDS OF PHOSPHOROUS AND SULFUR
Kwan-Ting Shen, St. Louis, Mo., assignor to Petrolite Corporation, Wilmington, Del., a corporation of Delaware
No Drawing. Filed May 21, 1962, Ser. No. 196,861
4 Claims. (Cl. 260—583)

This invention relates to inorganic amine salts of oxyacids of phosphorus and chalcogens having a molecular weight greater than 16, i.e. S, Se, Te (also referred to herein generally as "oxyacids").

More particularly this invention relates to salts of (1) oxyacids of sulfur and (2) oxyacids of phosphorus wherein the salts contain both an inorganic and an amine cation. Still more particularly this invention relates to salts of inorganic acids for example (1) sulfurous, sulfuric, etc. acids and (2) phosphorous, phosphoric, etc. acids which contain both an amine and an inorganic cation.

In general, these salts are prepared by neutralizing with an amine an inorganic salt of an oxyacid having at least one acidic hydrogen This reaction is illustrated by the following equations:

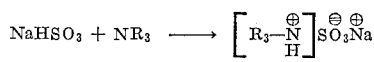

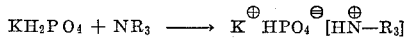

where R is hydrogen or a substituted group, such as a hydrocarbon group, alkyl, alkenyl, aryl, alkaryl, aralkyl, hydroxyalkyl, hydroxyoxyalkyleneetheralkyl, acylated and etherified derivatives of said hydroxy compounds, etc Analogous salts can also be prepared from other amines such as polyamines, heterocyclic amines, etc. for example,

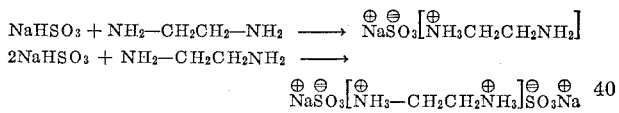

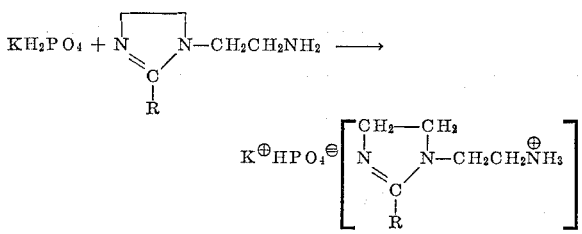

Since the above are idealized formulae, it should be understood that other reactions may also take place which may be represented by other formulae. Therefore, the above are presented to illustrate possible reactions rather than to limit the product formed to that stated in the formulae.

Any suitable oxyacid salt having replaceable hydrogen atoms which are capable of reacting with an amine can be employed in preparing the compounds of this invention, for example, acid salts of the following acids:

Oxyacids of phosphorous:
  $H_3PO_3$ (phosphorous acid)
  $H_3PO_4$ (phosphoric acid), and the like.
Oxyacids of sulfur:
  $H_2SO_3$ (sulfurous acid)
  $H_2SO_4$ (sulfuric acid), and the like.

Analogous oxyacids of selenium can also be employed for example $H_2SeO_3$, $H_2SeO_4$, etc.

In the compounds of this invention at least one of the hydrogens of the oxyacids is combined with the amine.

Thus, the salts of this invention contain at least one amine group and at least one inorganic cation. The remaining acid hydrogens may be unreacted or reacted to form either an inorganic or an amine cation. The inorganic cation is preferably an alkali metal.

In general, any basic amine capable of forming a salt with the oxyacid can be employed. The following are non-inclusive examples:

I. Monoamines

A. *Primary monoamines.*—These include compounds of the formula R—$NH_2$, where R is a substituted group preferably a hydrocarbon group, for example alkyl, cycloalkyl, aryl, alkenyl, heterocyclic, substituted derivatives of the above, etc.

ALKYL

Alkyl includes methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, eicosyl, docosyl, etc. having 1–50 or more carbons, such as 1–30, but preferably 1–18 carbons.

The term "alkyl" also includes isomers of the straight chain group wherein branching occurs along the chain, for example

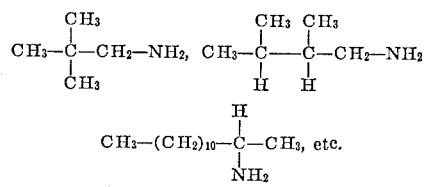

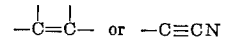

ALKENYL AND ALKINYL

These include unsaturated analogues of alkyl groups containing one or more

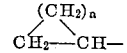

groups, for example decenyl, dodecenyl, tridecenyl, tetradecyl, pentadecenyl, hexadecenyl, heptadecenyl, octadecenyl, etc., dienes for example octadienyl, etc. trienes, for example octatrienyl, etc., alkinyl, for example butinyl, etc.

CYCLOALKYL

These include

for example cyclobutyl, cyclopentyl, cyclohexyl, cycloheptyl, cyclooctyl, etc.; substituted derivatives thereof, for example alkyl or polyalkyl, for example alkyl cyclohexyl, dialkyl cyclohexyl, etc.

ARYL

These include phenyl, substituted phenyl, alkyl phenyl, polyalkylphenyl, chlorophenyl, alkoxyphenyl, etc., naphthyl, alkyl naphthyl, etc.; benzyl, substituted benzyl, etc. groups.

HETEROCYCLIC

These include furyl, pyranyl, hydrogenated furyl, pyranyl, etc. groups.

B. *Secondary amines.*—These include amines of the formula

R—N—H
  |
  R′ where R and R′, which may or may not be the same, have the same meaning as stated above, for example dimethyl amine, diethyl amine, dipropyl amine, diamylamine, dihexyl amine, dioctyl amine, didodecyl amine, dihexyldecyl amine, etc., methyl ethyl amine, methyl octyl amine, butyl octylamine, methyl octadecyl amine, etc.; methyl octadecenyl amine, dioctadecenyl amine, etc.; dicyclohexyl amine, methyl cyclohexyl amine, etc.; methyl furyl amine, methyl benzyl amine.

C. *Tertiary amines.*—These include amines of the formula $$R-N-R''$$
$$|$$
$$R'$$

where the R's, which may or may not be the same, have the same meaning as stated above, for example, trimethyl amine, triethyl amine, dimethyl octyl, dimethyl dodecyl, dimethyl tetradecyl, diethyl hexadecyl, methyl ethyl octadecyl, dimethyl octadecyl, etc., dimethyl octadecenyl, diethyl hexadecenyl, etc. dodcyl benzyl methyl, decyl dibenzyl, etc.; dimethyl furyl, etc., dimethyl phenyl, diethyl naphthyl, etc., dicyclohexyl methyl, dimethyl cyclohexyl, etc.

D. *Commercial amines.*—Representative commercial amines are available, for example, these shown in the following tables.

The nomenclature of these amines is derived from either their chain length or source of raw material, for example, Armeen 8D—octyl amine
Armeen C—coconut oil amine
Armeen S—soybean oil amine
Armeen T—tallow amine
Armeen O—oleyl amine
Armeen HT—hydrogenated tallow amine
Armeen DMCD—dihydrogenated tallow amine
Armeen M2HT—dimethyl coconut oil amine.

Products with "D" designate distilled grade. Products without D designate technical grade.

TABLE I

| N-alkyl Chain | Carbon Chain Length | Primary | | | | | | | | | | | | | | | | Secondary | | Diamines | | | |
|---|---|---|---|---|---|---|---|---|---|---|---|---|---|---|---|---|---|---|---|---|---|---|---|
| | | Armeen 8D | Armeen 10D | Armeen 12 | Armeen 12D | Armeen 14D | Armeen 16D | Armeen HT | Armeen HTD | Armeen 18 | Armeen 18D | Armeen T | Armeen TD | Armeen S | Armeen SD | Armeen C | Armeen CD | Armeen 2C | Armeen 2HT | Duomeen C | Duomeen CD | Duomeen S | Duomeen T |
| Hexyl | 6 | 3 | | | | | | | | | | | | | | | | | | | | | |
| Octyl | 8 | 90 | 4 | | | | | | | | | | | | | 8 | 8 | 8 | | 8 | 8 | | |
| Decyl | 10 | 7 | 90 | 2 | 2 | | | | | | | | | | | 9 | 9 | 9 | | 9 | 9 | | |
| Dodecyl | 12 | | 6 | 95 | 95 | 4 | | | | | | | | | | 47 | 47 | 47 | | 47 | 47 | | |
| Tetradecyl | 14 | | | 3 | 3 | 92 | | 2 | 2 | | | 2 | 2 | | | 18 | 18 | 18 | | 18 | 18 | | 2 |
| Hexadecyl | 16 | | | | | 4 | 92 | 24 | 24 | 6 | 6 | 24 | 24 | 20 | 20 | 8 | 8 | 8 | 24 | 8 | 5 | 20 | 24 |
| Octadecyl | 18 | | | | | | 7 | 71 | 71 | 90 | 90 | 28 | 28 | 17 | 17 | 5 | 5 | 10 | 75 | 5 | 5 | 17 | 28 |
| Octadecenyl | 18 | | | | | | 1 | 3 | 3 | 4 | 4 | 46 | 46 | 26 | 26 | 5 | 5 | | 1 | 5 | 5 | 26 | 46 |
| Octadecadienyl | 18 | | | | | | | | | | | | | | | | | | | | | 46 | |
| Mol. combining wt | | 135 | 166 | 213 | 195 | 227 | 250 | 300 | 275 | 300 | 280 | 298 | 274 | 297 | 275 | 223 | 208 | 450 | 530 | 321 | 310 | 402 | 400 |
| Primary Amine | | 90 | | 82 | 94 | 92 | 95 | 85 | 95 | 85 | 95 | 85 | 95 | 86 | 95 | 85 | 95 | | | 40 | 44 | 40 | 40 |
| Secondary Amine | | | | | | | | | | | | | | | | | | 85 | 85 | | | | |
| Approx. Melting Pt., °C | | −13 | 8 | 24 | 24 | 29 | 38 | 57 | 55 | 55 | 55 | 46 | 41 | 31 | 22 | 24 | 21 | 46 | 68 | 22 | 20 | 40 | 46 |
| Color—FAC | | 3 | 3 | 9 | 3 | 3 | 3 | 11 | 3 | 11 | 3 | 11 | 3 | 19 | 7 | 11 | 3 | 9 | 5 | 19 | 11 | 13 | 19 |
| Grade: D—Distilled, T—Technical | | D | D | T | D | D | D | T | D | T | D | T | D | T | D | T | D | D | D | T | D | T | T |

TABLE II

| N-alkyl Chain | Carbon Chain Length | Dimethyl Tertiary Amine | | | | | | | | | | Dialkyl Tertiary Amines | | |
|---|---|---|---|---|---|---|---|---|---|---|---|---|---|---|
| | | Armeen DM16 | Armeen DM16D | Armeen DM18 | Armeen DM18D | Armeen DMC | Armeen DMCD | Armeen DMS | Armeen DMSD | Armeen DMHT | Armeen DMHTD | Armeen M2HT | Armeen M2C | Armeen M2S |
| Hexyl | 6 | | | | | | | | | | | | | |
| Octyl | 8 | | | | | 8 | 8 | | | | | | 8 | |
| Decyl | 10 | | | | | 9 | 9 | | | | | | 9 | |
| Dodecyl | 12 | | | | | 47 | 47 | | | | | | 47 | |
| Tetradecyl | 14 | | | | | 18 | 18 | | | 2 | 2 | 2 | 18 | |
| Hexadecyl | 16 | 92 | 92 | 6 | 6 | 8 | 8 | 20 | 20 | 24 | 24 | 24 | 8 | 20 |
| Octadecyl | 18 | 7 | 7 | 90 | 90 | 5 | 5 | 17 | 17 | 71 | 71 | 71 | 5 | 17 |
| Octadecenyl | 18 | 1 | 1 | 4 | 4 | | | 26 | 26 | 3 | 3 | 3 | | 26 |
| Octadecadienyl | 18 | | | | | | | 37 | 37 | | | | | 37 |
| Mol. weight—theoretical | | 271 | 271 | 295 | 295 | 224 | 224 | 289 | 289 | 289 | 289 | 522 | 389 | 520 |
| Mol. combining weight | | 338 | 295 | 369 | 321 | 280 | 244 | 361 | 314 | 361 | 314 | 564 | 436 | 594 |
| Percent Tertiary Amine | | 80 | 92 | 80 | 92 | 80 | 92 | 80 | 92 | 80 | 92 | | | |
| Approx. Melting Pt., °C | | 15 | 10 | 23 | 20 | −10 | −15 | 0 | −8 | 17 | 15 | 28 | −5 | 9 |
| Color—Gardner—1933 | | 5 | 1 | 5 | 1 | 5 | 1 | 10 | 1 | 5 | 1 | | | |
| D—Distilled, T—Technical | | T | D | T | D | T | D | T | D | T | D | T | T | T |

Other commercial amines include the following:
"Primene" amines

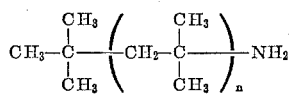

Rosin Amine D

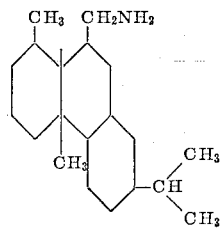

etc.

E. *Cyclic secondary and tertiary amines.*—Also included within the definition of secondary and tertiary amines are those amines where two of the R groups are joined in a cyclic structure such as

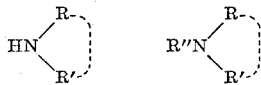

Examples of these amines include pyridine, quinoline, isoquinoline, acridine, piperidine, piperazine, morpholine, etc. Certain N-substituted derivatives thereof, such as N-alkyl morpholine, N-alkyl piperidine, N-alkyl piperazine, etc., for example N-dodecylmorpholine,
N-octadecylmorpholine,
N-dodecylbenzylmorpholine,
N-nonylmethylbenzylmorpholine,
N-cetylpiperidine,
Octylphenoxyethoxyethylmorpholine,
Nonylphenoxyethoxyethylpiperidine,

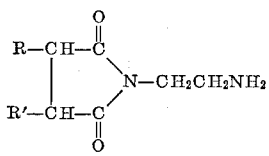

(R and R'=alkyl, alkenyl, hydrogen, etc.)

II. *Polyamines*

These include polyamines corresponding to the formula

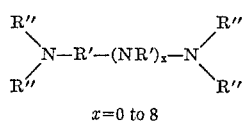

$x = 0$ to $8$ in which R" (which may or may not be the same) is hydrogen, alkyl, cycloalkyl, aryl, or aralkyl and R' is a divalent radical such as

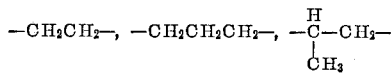

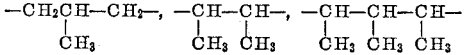

etc.
Ethylenediamine
Diethylenetriamine
Triethylenetetramine
Tetraethylenepentamine
Propylenediamine
Dipropylenetriamine
Tripropylenetetramine
Butylenediamine
Aminoethylpropylenediamine
Aminoethylbutylenediamine

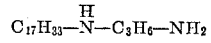

Other polyamines in which the nitrogen atoms are separated by a carbon atom chain having 4 or more carbon atoms include the following: Tetramethylenediamine, pentamethylenediamine, and especially hexamethylenediamine.

Another class of polyamines which may be employed are those sold under the trademark "Duomeen" which is a designation for certain diamines. "Duomeen" amines have the following general formula:

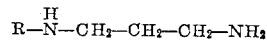

R is an alkyl group derived from a fatty acid or from the mixed fatty acids as obtained from certain oils. The specific "Duomeen" and the source of the radical R are as follows:

(1) "Duomeen" 12, R=lauric
(2) "Duomeen" C, R=coconut oil fatty acid
(3) Similarly, a comparable diamine, obtained from Rosin Amine D and acrylonitrile, can be prepared.

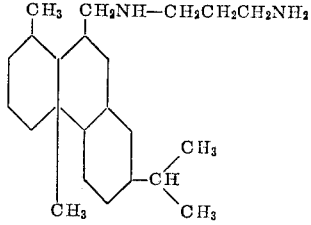

Additional examples of polyamines include the following:

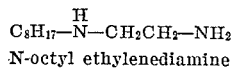
N-octyl ethylenediamine

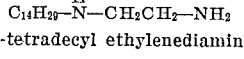
N-tetradecyl ethylenediamine

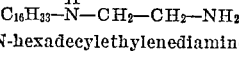
N-hexadecylethylenediamine

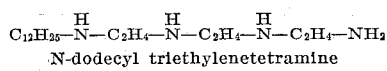
N-dodecyl triethylenetetramine

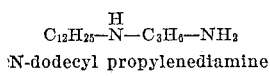
N-dodecyl propylenediamine

Diamines containing tertiary amino groups for example

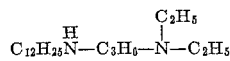

It is to be noted that the above examples show high molal groups, i.e., 8 carbon atoms or more. The same derivatives in which methyl, ethyl, propyl, butyl, amyl, hexyl groups, or the like, appear instead of octyl, decyl, etc., are equally satisfactory.

Acylated polyamines can also be employed provided they are sufficiently basic to form salts, for example:

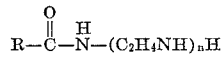

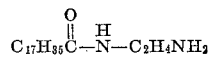

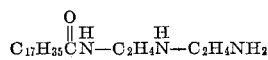

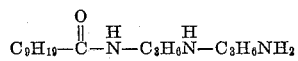

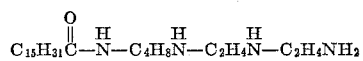

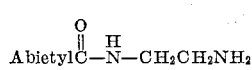

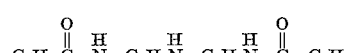

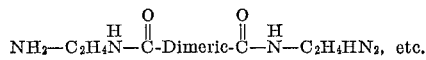

III. Cyclic amidines

The expression "cyclic amidine" is employed in its usual sense to indicate ring compounds in which there are present either 5 or 6 members, and having 2 nitrogen atoms separated by a single carbon atom supplemented by either two additional carbon atoms or three additional carbon atoms in the main chain completing the ring. All the carbon atoms may be substituted. The nitrogen atom of the ring, involving monovalent linkages (the 1-position), may be unsubstituted or substituted for example, an alkylene amine group, a polyalkylene amino group, an alkylene hydroxyl group, a polyoxyalkylene hydroxy group, an alkylenethiol group, a polythioalkylenethiol group, a polyalkylene group containing both sulfur and oxygen, nitrogen and oxygen, nitrogen, sulfur and oxygen, etc.

These cyclic amidines are further characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids, aromatic acids, polycarboxy acids, acids containing heterocyclic rings, and the like.

For details of the preparation of imidazolines from amines, see the following U.S. patents, U.S. No. 1,999,989 dated Apr. 30, 1935, Max Bockmuhl et al.; U.S. No. 2,155,877 dated Apr. 25, 1939, Edmund Waldmann et al.; and U.S. No. 2,155,878 dated Apr. 25, 1939, Edmund Waldman et al. Also see Chem. Rev. 32, 47 (43), Chem. Rev. 54, 593 (54), and "Imidazole and Derivatives, I" by K. Hofmann (1953).

Equally suitable for use in preparing compounds useful in this invention and for the preparation of tetrahydropyrimidines substituted in the 2-position are the corresponding polyamines containing at least one primary amino group separated from the first primary amino group by three carbon atoms instead of being separated by only 2 carbons as with imidazolines. This reaction, as in the case of the imidazolines, is generally carried out by heating the reactants to a temperature at which 2 moles of water are evolved and ring closure is effected. For details of the preparation of tetrahydropyrimidines, see German Patent No. 700,371 dated Dec. 18, 1940, to Edmund Waldmann and August Chwala; German Patent No. 701,322 dated Jan. 14, 1941, to Karl Kiescher, Ernst Urech and Willi Klarer, and U.S. Patent No. 2,194,419 dated Mar. 19, 1940, to August Chwala.

Substituted imidazolines and tetrahydropyrimidines are obtained from a variety of acids beginning with the one-carbon acid (formic) through and includnig higher fatty acids or the equivalent having 1–30 or more carbon atoms such as from 8–22 carbons. Modified fatty acids also can be employed as, for example, phenyl stearic acid or the like. Cyclic acids may be employed, including naphthenic acids. A variety of other acids, including benzoic acid, substituted benzoic acid, salicyclic acid, and the like, have been employed to furnish the residue

from the acid RCOOH in which the C of the residue

is part of the ring. The fatty acids employed, for example, may be saturated or unsaturated. They may be hydroxylated or non-hydroxylated. Branched long chain fatty acids may be employed. See J. Am. Chem. Soc. 74, 2523 (1952). This applies also to the lower molecular weight acids as well.

As is well known, cyclic amidines containing in the 1-position a substituted group can be prepared by reacting a suitable amine with the desired carboxylic acid under suitable conditions so as to remove 2 moles of water for each equivalent of carboxylate radical. Thus, where one employs a diamine such as ethylene or propylene diamine, a cyclic amidine which is unsubstituted in the 1-position is obtained. This compound can be reacted with such compounds as alkylene oxides, alkylene sulfides, alkylene imines and the like to produce compounds of the formula

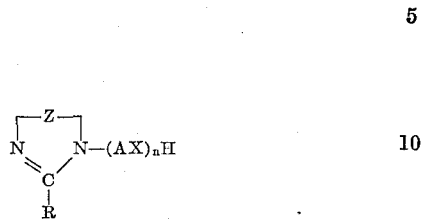

where Z is the residuum of the cyclic amidine ring, derived from the cyclic amidine forming polyamine, R is the group derived from the carboxylic acid, and A is alkylene, X is oxygen, amino, sulfur, etc. and $n$ is a number for example 1–10 or higher.

Alternatively amino and polyamino substituted cyclic amidine compounds can be prepared from polyamines such as a triamine or higher amines, for example, diethylene triamine, triethylene tetraethylene pentamine, corresponding propylene analogues, etc. Thus, when one reacts diethylene triamine with a carboxylic acid or its esters, one obtains

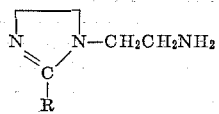

and with triethylene tetramine one obtains

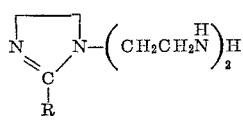

It should be noted that Z can also be part of an aromatic ring. Thus, by reacting

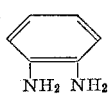

with a carboxylic acid one obtains

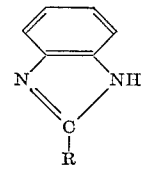

Hydroxy-substituted imidazolines and tetrahydropyrimidines can be obtained in the manner described above from a wide variety of polyamines containing hydroxy groups. Thus, where one starts with a polyamine, for example, a diamine of the following formula:

$$NH_2Z-\overset{H}{N}-Z'-OH \quad \text{or} \quad NH_2-Z-\overset{H}{N}-(OZ')_nOH$$

where Z and Z' have a 2 or 3 carbon chain in the main chain, one obtains the hydroxyalkylene compounds useful in this invention. In addition, one can start with ethylene diamine or with 1,2-propylene diamine, 1,3-propylene diamine or other polyamines and then react the cyclic amidine so obtained with alkylene oxides so as to produce a terminal hydroxy group since the nitrogen bonded hydrogen on the 1-position on the ring reacts with alkylene oxides. In addition, the hydroxyalkylene group can be further oxyalkylated.

Thiol-containing compounds are prepared in a manner analogous to that employed in preparing the hydroxy-substituted cyclic amidines, for example, by employing $$NH_2Z-\overset{H}{N}-Z'SH$$

or by employing alkylene sulfides to react with the imidazolines having an unsubstituted 1-position.

Of course, it will be realized that the above compounds containing sulfur, oxygen or nitrogen can be employed as well as any combinations of two of these elements within the same molecule, for example, cyclic amidines prepared from $$NH_2-Z-\overset{H}{N}-Z'S(Z''O)_nH, \quad NH_2-Z-\overset{H}{N}-Z'-\overset{H}{N}Z''OH$$

etc.

Thus, cyclic amidines within the scope of this invention comprise compounds of the formulae:

(1) 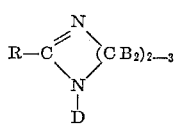

(2) 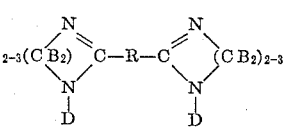

(3) 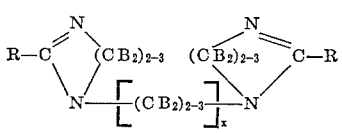

where RC= and =C—R—C= are the resdues derived from the carboxylic acid, monocarboxylic acids in (1) and (3), and dicarboxylic acids in (2), where R comprises a hydrocarbon radical having, for example, 1–30 carbon atoms, hydrocarbons in which the carbon atom chain is interrupted by oxygen, etc.; and B is a hydrogen or a hydrocarbon radical; D is hydrogen or a radical, for example —(AX)$_n$H where X is amino, oxygen or sulfur, and A is an alkylene radical containing, for example, 2–3 carbons in its main chain wherein $n$ and $x$ are numbers, for example, 1–10 or higher, advantageously 1–3, but preferably 1, and (CB$_2$)$_n$ is, for example a divalent radical of the formula:

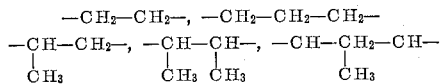

In (2) CB$_2$'s and the 1-substituted side chain may be the same or different.

Actually, substituted cylic amidines can be obtained from a variety of polyamines, but only in the instance where one starts with a triamine or higher amine is there a residual group having a primary amino radical as herein required. This does not mean, however, that one could not start with ethylene diamine or with 1,2-propylene diamine. The cylic amidines so obtained could be reacted with a mole of ethylene imine or propylene imine so as to introduce the terminal primary amino group. From a practical standpoint, however, the most readily available polyamines are ethylene diamine, diethylene triamine, triethylene tetramine, and tetraethylene pentamine. However, other polyamines having some other divalent radical, such as

can be employed.

Table III is limited to derivatives of the four most readily available polyamines above indicated.

TABLE III

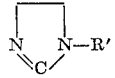

| Ex. No. | RCOOH source of RC= | R' |
|---|---|---|
| 1a | Lauric | CH$_2$CH$_2$NH$_2$ |
| 2a | Hexanoic | CH$_2$CH$_2$NH$_2$ |
| 3a | Isovaleric | CH$_2$CH$_2$NH$_2$ |
| 4a | Stearic | CH$_2$CH$_2$NH$_2$ |
| 5a | Melissic | CH$_2$CH$_2$NH$_2$ |
| 6a | Phenyl stearic | CH$_2$CH$_2$NH$_2$ |
| 7a | Benzoic | CH$_2$CH$_2$NH$_2$ |
| 8a | Cresotinic | CH$_2$CH$_2$NH$_2$ |
| 9a | Naphthenic | CH$_2$CH$_2$NH$_2$ |
| 10a | Oleic | CH$_2$CH$_2$NH$_2$ |
| 11a | ----do---- | CH$_2$CH$_2$NHCH$_2$CH$_2$NH$_2$ |
| 12a | Pelargonic | CH$_2$CH$_2$NHCH$_2$CH$_2$NH |
| 13a | Lauric | CH$_2$CH$_2$NHCH$_2$CH$_2$NH |
| 14a | Palmitic | CH$_2$CH$_2$NHCH$_2$CH$_2$NH |
| 15a | Cerotic | CH$_2$CH$_2$NHCH$_2$CH$_2$NH |
| 16a | p-Tert-butyl benzoic | CH$_2$CH$_2$NHCH$_2$CH$_2$NH |
| 17a | p-Methoxy benzoic | CH$_2$CH$_2$NHCH$_2$CH$_2$NH |
| 18a | Toluic | CH$_2$CH$_2$NHCH$_2$CH$_2$NH |
| 19a | Naphthenic | CH$_2$CH$_2$NH$_2$CH$_2$CH$_2$NH$_2$ |
| 20a | p-Hydroxy benzoic | CH$_2$CH$_2$NH$_2$CH$_2$CH$_2$NH$_2$ |
| 21a | Formic | CH$_2$CH$_2$NHCH$_2$CH$_2$NHCH$_2$CH$_2$NH$_2$ |
| 22a | Methyloctadecanoic | CH$_2$CH$_2$NHCH$_2$CH$_2$NHCH$_2$CH$_2$NH$_2$ |
| 23a | Capric | CH$_2$CH$_2$NHCH$_2$CH$_2$NHCH$_2$CH$_2$NH$_2$ |
| 24a | Stearic | CH$_2$CH$_2$NHCH$_2$CH$_2$NHCH$_2$CH$_2$NH$_2$ |
| 25a | Phenylstearic | CH$_2$CH$_2$NHCH$_2$CH$_2$NHCH$_2$CH$_2$NH$_2$ |
| 26a | Cresotinic | CH$_2$CH$_2$NHCH$_2$CH$_2$NHCH$_2$CH$_2$NH$_2$ |
| 27a | Linoleic | CH$_2$CH$_2$NHCH$_2$CH$_2$NHCH$_2$CH$_2$NH$_2$ |
| 28a | Oleic | CH$_2$CH$_2$NHCH$_2$CH$_2$NHCH$_2$CH$_2$NH$_2$ |
| 29a | 3-methoxybenzoic | CH$_2$CH$_2$NHCH$_2$CH$_2$NHCH$_2$CH$_2$NH$_2$ |
| 30a | Naphthenic | CH$_2$CH$_2$NHCH$_2$CH$_2$NHCH$_2$CH$_2$NH$_2$ |
| 31a | Lauric | CH$_2$CH$_2$NHCH$_2$CH$_2$NHCH$_2$CH$_2$NH$_2$ |
| 32a | Benzoic | CH$_2$CH$_2$NHCH$_2$CH$_2$NHCH$_2$CH$_2$NH$_2$ |

The only polyamines available on a large scale for the manufacture of tetrahydropyrimidines are propylene diamine and 3,3'–iminobispropylamine. This latter product can be converted into the tetramine or pentamine by appropriate reaction with a suitable imine or by reaction with acrylonitrile, followed by the usual steps of converting the intermediate into the amine. Tetrahydropyrimidines, comparable to the imidazolines of Table III appear in Table IV, immediately following.

TABLE IV

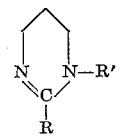

| Ex. No. | RCOOH source of RC | R' |
|---|---|---|
| 1b | Formic | CH$_2$CH$_2$CH$_2$NH$_2$ |
| 2b | Acetic | CH$_2$CH$_2$CH$_2$NH$_2$ |
| 3b | Butyric | CH$_2$CH$_2$CH$_2$NH$_2$ |
| 4b | Valeric | CH$_2$CH$_2$CH$_2$NH$_2$ |
| 5b | Isovaleric | CH$_2$CH$_2$CH$_2$NH$_2$ |
| 6b | Phenyl acetic | CH$_2$CH$_2$CH$_2$NH$_2$ |
| 7b | Pelargonic | CH$_2$CH$_2$CH$_2$NH$_2$ |
| 8b | Lauric | CH$_2$CH$_2$CH$_2$NH$_2$ |
| 9b | Stearic | CH$_2$CH$_2$CH$_2$NH$_2$ |
| 10b | Arachidic | CH$_2$CH$_2$CH$_2$NH$_2$ |
| 11b | Eicosane-carboxylic | CH$_2$CH$_2$CH$_2$NH$_2$ |
| 12b | Cerotic | CH$_2$CH$_2$CH$_2$NH$_2$ |
| 13b | Melissic | CH$_2$CH$_2$CH$_2$NH$_2$ |
| 14b | Phenyl stearic | CH$_2$CH$_2$CH$_2$NH$_2$ |
| 15b | Benzoic | CH$_2$CH$_2$CH$_2$NH$_2$ |
| 16b | p-Methoxy benzoic | CH$_2$CH$_2$CH$_2$NH$_2$ |
| 17b | Cresotinic | CH$_2$CH$_2$CH$_2$NH$_2$ |
| 18b | Salicylic | CH$_2$CH$_2$CH$_2$NH$_2$ |
| 19b | p-tert-Butylbenzoic | CH$_2$CH$_2$CH$_2$NH$_2$ |
| 20b | p-Ethoxy benzoic | CH$_2$CH$_2$CH$_2$NH$_2$ |
| 21b | Oleic | CH$_2$CH$_2$CH$_2$NH$_2$ |
| 22b | Undecylenic | CH$_2$CH$_2$CH$_2$NH$_2$ |
| 23b | Linoleic | CH$_2$CH$_2$CH$_2$NH$_2$ |
| 24b | Hydroxy butyric | CH$_2$CH$_2$CH$_2$NH$_2$ |
| 25b | Methyloctadecanoic | CH$_2$CH$_2$CH$_2$NH$_2$ |
| 26b | Napthenic | CH$_2$CH$_2$CH$_2$NH$_2$ |
| 27b | Palmitic | CH$_2$CH$_2$CH$_2$NH$_2$ |

The procedure employed in the manufacture of suitable substituted imidazolines from dicarboxylic acids is comparable to that employed when monocarboxylic acids are used as reactants. Suitable amines derived from the three amines previously noted are described in Table V.

TABLE V

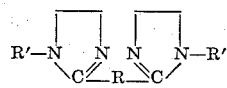

| Ex. No. | HOOC—R—COOH source of —CRC— | R' |
|---|---|---|
| 1c | Succinic | $CH_2CH_2NH_2$ |
| 2c | Adipic | $CH_2CH_2NH_2$ |
| 3c | Suberic | $CH_2CH_2NH_2$ |
| 4c | Sebacic | $CH_2CH_2NH_2$ |
| 5c | Nonodecane dicarboxylic | $CH_2CH_2NH_2$ |
| 6c | Diglycolic | $CH_2CH_2NH_2$ |
| 7c | Ethylene bis(glycolic) | $CH_2CH_2NH_2$ |
| 8c | Methylene dibenzoic | $CH_2CH_2NH_2$ |
| 9c | Stearyl malonic | $CH_2CH_2NH_2$ |
| 10c | Phthalic | $CH_2CH_2NH_2$ |
| 11c | Succinic | $CH_2CH_2NHCH_2CH_2NH_2$ |
| 12c | Glutaric | $CH_2CH_2NHCH_2CH_2NH_2$ |
| 13c | Pimelic | $CH_2CH_2NHCH_2CH_2NH_2$ |
| 14c | Azelaic | $CH_2CH_2NHCH_2CH_2NH_2$ |
| 15c | Eiocasane dicarboxylic | $CH_2CH_2NHCH_2CH_2NH_2$ |
| 16c | Dilinoleic | $CH_2CH_2NHCH_2CH_2NH_2$ |
| 17c | Isophthalic | $CH_2CH_2NHCH_2CH_2NH_2$ |
| 18c | Diglycolic | $CH_2CH_2NHCH_2CH_2NH_2$ |
| 19c | Lauryl malonic | $CH_2CH_2NHCH_2HN_2$ |
| 20c | Methylene dibenzoic | $CH_2CH_2NHCH_2CH_2NH_2$ |
| 21c | Adipic | $CH_2CH_2NHCH_2CH_2NHCH_2CH_2NH_2$ |
| 22c | Succinic | $CH_2CH_2NHCH_2CH_2NHCH_2CH_2NH_2$ |
| 23c | Suberic | $CH_2CH_2NHCH_2CH_2NHCH_2CH_2NH_2$ |
| 24c | Pimelic | $CH_2CH_2NHCH_2CH_2NHCH_2CH_2NH_2$ |
| 25c | Nonedecane dicarboxylic | $CH_2CH_2NHCH_2CH_2NHCH_2CH_2NH_2$ |
| 26c | Diglycolic | $CH_2CH_2NHCH_2CH_2NHCH_2CH_2NH_2$ |
| 27c | Methylene dibenzoic | $CH_2CH_2NHCH_2CH_2NHCH_2CH_2NH_2$ |
| 28c | Stearyl malonic | $CH_2CH_2NHCH_2CH_2NHCH_2CH_2NH_2$ |
| 29c | Stearyl succinic | $CH_2CH_2NHCH_2CH_2NHCH_2CH_2NH_2$ |
| 30c | Terephthalic | $CH_2CH_2NHCH_2CH_2NHCH_2CH_2NH_2$ |
| 31c | Dilinoleic | $CH_2CH_2NHCH_2CH_2NHCH_2CH_2NH_2$ |
| 32c | Phthalic | $CH_2CH_2NHCH_2CH_2NHCH_2CH_2NH_2$ |

In the use of dicarboxy acid, the bulk of the examples were obtained from 3,3'-iminobispropylamine. These compounds which appear in Table VI are comparable to those which appeared in Table V preceding.

TABLE VI

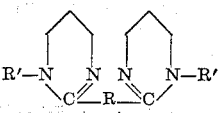

| Ex. No. | HOOC—R—COOH source of —CRC— | R' |
|---|---|---|
| 1d | Alkenylsuccinic (alkenyl $C_{12}$) | $CH_2CH_2CH_2NH_2$ |
| 2d | Succinic | $CH_2CH_2CH_2NH_2$ |
| 3d | Glutaric | $CH_2CH_2CH_2NH_2$ |
| 4d | Adipic | $CH_2CH_2CH_2NH_2$ |
| 5d | Suberic | $CH_2CH_2CH_2NH_2$ |
| 6d | Sebacic | $CH_2CH_2CH_2NH_2$ |
| 7d | Pimelic | $CH_2CH_2CH_2NH_2$ |
| 8d | Azelaic | $CH_2CH_2CH_2NH_2$ |
| 9d | Nonodecane dicarboxylic | $CH_2CH_2CH_2NH_2$ |
| 10d | Eicosane dicarboxylic | $CH_2CH_2CH_2NH_2$ |
| 11d | Diglycolic | $CH_2CH_2CH_2NH_2$ |
| 12d | Ethylene bisglycolic | $CH_2CH_2CH_2NH_2$ |
| 13d | Methylene disalicyclic | $CH_2CH_2CH_2NH_2$ |
| 14d | Dilinoleic | $CH_2CH_2CH_2NH_2$ |
| 15d | Stearyl malonic | $CH_2CH_2CH_2NH_2$ |
| 16d | Lauryl succinic | $CH_2CH_2CH_2NH_2$ |
| 17d | Isotetradecyl succinic | $CH_2CH_2CH_2NH_2$ |
| 18d | Phthalic | $CH_2CH_2CH_2NH_2$ |
| 19d | Isophthalic | $CH_2CH_2CH_2NH_2$ |
| 20d | Terephthalic | $CH_2CH_2CH_2NH_2$ |
| 21d | Phenyl acetic | $CH_2CH_2CH_2NH_2$ |
| 22d | Maleic | $CH_2CH_2CH_2NH_2$ |

In addition, one can employ hydroxy compounds as the amidine precursor, for example, cyclic amidines shown in the above tables wherein R' is —$(CH_2CH_2O)_nH$ and $n$ is 1–10, but preferably 1. Thus, R' may be —$(CH_2CH_2)OH$, —$(CH_2CH_2O)_2H$, —$(CH_2CH_2O)_3H$, etc. In addition, the —$CH_2$—$CH_2$— group may be a higher homologue, for example, propylene, butylene, etc.

Compounds of this type are shown in Tables VII and VIII.

TABLE VII

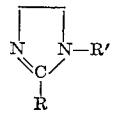

| Ex. No. | RCOOH source of RC | R' |
|---|---|---|
| 1a | Lauric | $CH_2CH_2OH$ |
| 2a | Hexanoic | $CH_2CH_2OH$ |
| 3a | Isovaleric | $CH_2CH_2OH$ |
| 4a | Stearic | $CH_2CH_2OH$ |
| 5a | Melissic | $CH_2CH_2OH$ |
| 6a | Phenyl stearic | $CH_2CH_2OH$ |
| 7a | Benzoic | $CH_2CH_2OH$ |
| 8a | Creosotonic | $CH_2CH_2OH$ |
| 9a | Naphthenic | $CH_2CH_2OH$ |
| 10a | Oleic | $CH_2CH_2OH$ |
| 11a | do | $CH_2CH_2OCH_2CH_2OH$ |
| 12a | do | $\overset{CH_3}{\underset{|}{C}}H_2CH_2O\overset{CH_3}{\underset{|}{C}}H_2CH_2OH$ |
| 13a | Lauric | $CH_2CH_2OCH_2CH_2OH$ |
| 14a | Palmitic | $CH_2CH_2OCH_2CH_2OH$ |
| 15a | Cerotic | $CH_2CH_2OCH_2CH_2OH$ |
| 16a | p-tert-Butyl benzoic | $CH_2CH_2OCH_2CH_2OH$ |
| 17a | Benzoic | $CH_2CH_2OCH_2CH_2OH$ |
| 18a | Toluic | $CH_2CH_2OCH_2CH_2OH$ |
| 19a | Naphthenic | $CH_2CH_2OCH_2CH_2OH$ |
| 20a | Benzoic | $CH_2CH_2OCH_2CH_2OH$ |
| 21a | Formic | $CH_2CH_2OCH_2CH_2OCH_2CH_2OH$ |
| 22a | Methyloctadecanoic | $CH_2CH_2OCH_2CH_2OCH_2CH_2OH$ |
| 23a | Capric | $CH_2CH_2OCH_2CH_2OCH_2CH_2OH$ |
| 24a | Stearic | $CH_2CH_2OCH_2CH_2OCH_2CH_2OH$ |
| 25a | Phenylstearic | $CH_2CH_2OCH_2CH_2OCH_2CH_2OH$ |
| 26a | Cresotinic | $CH_2CH_2OCH_2CH_2OCH_2CH_2OH$ |
| 27a | Linoleic | $CH_2CH_2OCH_2CH_2OCH_2CH_2OH$ |
| 28a | Oleic | $CH_2CH_2OCH_2CH_2OCH_2CH_2OH$ |
| 29a | 3-methoxybenzoic | $CH_2CH_2OCH_2CH_2OCH_2CH_2OH$ |
| 30a | Naphthenic | $CH_2CH_2OCH_2CH_2OCH_2CH_2OH$ |

TABLE VIII

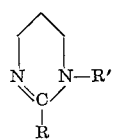

| Ex. No. | RCOOH source of RC | R' |
|---|---|---|
| 1b | Formic | CH₂CH₂OH |
| 2b | Acetic | CH₂CH₂OH |
| 3b | Butyric | CH₂CH₂OH |
| 4b | Valeric | CH₂CH₂OH |
| 5b | Isovaleric | (CH₃)CH₂CH₂OH |
| 6b | Trimethyl acetic | CH₂CH₂OH |
| 7b | Pelargonic | CH₂CH₂OH |
| 8b | Lauric | CH₂CH₂OCH₂CH₂OH |
| 9b | Stearic | CH₂CH₂OH |
| 10b | Arachidic | CH₂CH₂OH |
| 11b | Eicosane carboxylic | (CH₃)CH₂CH₂OH |
| 12b | Cerotic | CH₂CH₂OH |
| 13b | Melissic | CH₂CH₂OH |
| 14b | Phenyl stearic | CH₂CH₂OH |
| 15b | Benzoic | CH₂CH₂OCH₂CH₂OH |
| 16b | p-Methybenzoic acid | CH₂CH₂OH |
| 17b | Cresotinic | CH₂CH₂OH |
| 18b | p-Methybenzoic | CH₂CH₂OCH₂CH₂OH |
| 19b | p-tert-Butylbenzoic | CH₂CH₂OH |
| 20b | 3-Methoxy benzoic | CH₂CH₂OH |
| 21b | Oleic | CH₂CH₂OH |
| 22b | Undecylenic | CH₂CH₂OH |
| 23b | Linoleic | CH₂CH₂OH |
| 24b | Butyric | CH₂CH₂OCH₂CH₂OH |
| 25b | Methyloctadecanoic | CH₂CH₂OH |

Oxygen compounds analogous to those shown in tables V and VI can also be employed.

Furthermore, R' can also be —(CH₂CH₂S)ₙH where $n$ is 1–10, but preferably 1, forming a compound analogous to the above oxygen compounds. Additionally, R' can be a group containing —(CH₂CH₂X)ₙH where X may be —NH—, —O—, —S—, and all three, two, or one of these elements can be present in the R' grouping, for example where R' is

—CH₂CH₂N(H)—CH₂CH₂—OH, —CH₂CH₂—S—CH₂CH₂OH
—CH₂CH₂SCH₂CHO₂CH₂CH₂NH₂ and the like.

In addition, cyclic amidines of the following type can also be employed:

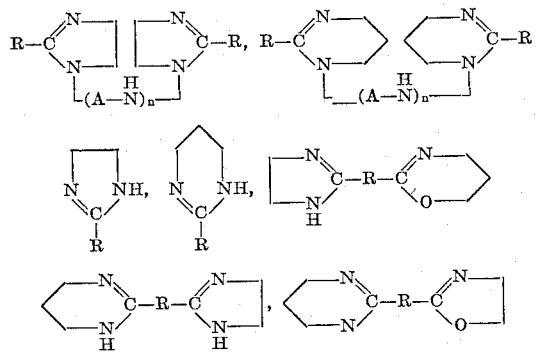

substituted derivatives thereof, similar or analogous compounds, etc.

Included within the scope of this invention are cyclic amidines having modified side chains, where for example the amino, hydroxyl, etc. group is acylated for example of the type

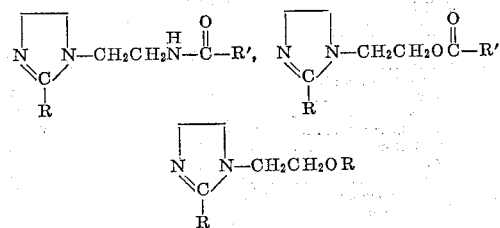

etc.

Cyclic amines analogous to cyclic amidines can also be employed in this invention. As cyclic amidines are formed from reacting a fatty acid or its equivalent with a cyclic amidine forming polyamine

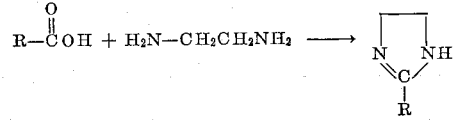

Oxazolines are formed by reacting a fatty acid with an oxazoline forming hydroxylamine

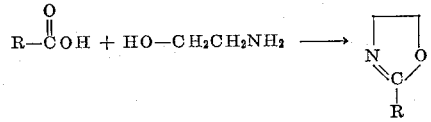

Sulfur analogues there can also be prepared

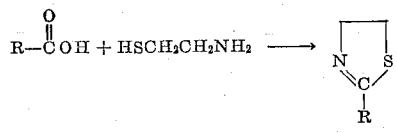

Similarly

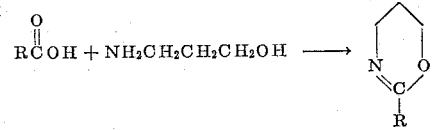

The sulfur analogue thereof is

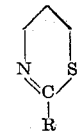

The oxazoline and thiaoxazoline can also be substituted, for example in

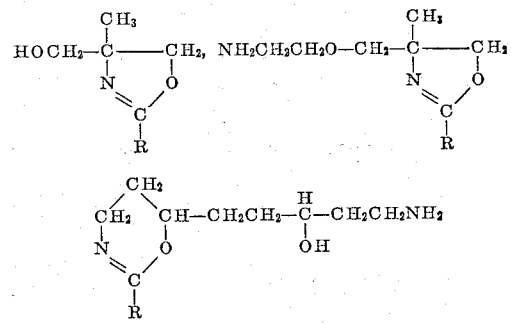

and sulfur analogues thereof.

The R in the oxazoline and thiaoxazoline can be the same as those employed in preparing cyclic amidine. Similarly, analogous dicyclic compounds can also be prepared for example

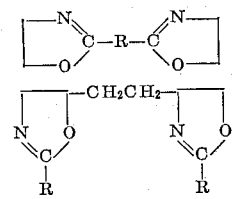

etc.

In addition, the cyclic amidine structure may be substituted with other than a hydrocarbon group, for example, a sulfur containing group such as

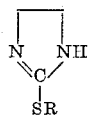

wherein R is a substituted group for example, a hydrocarbon group alkyl, aryl, etc.

Imidagolidines, thiazolidines, dazolidines and their six-membered ring analogues can also be employed, for example

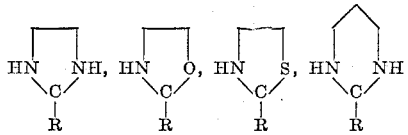

etc.

Additional miscellaneous amines includes the following: Hydrazine; substituted hydrazine; guanidines; substituted guanidine; polyalkyleneimine, for example polyethyleneimine, polypropyleneimine having molecular weights of from about 400 or less to 100,000 or more; compounds of the formulae

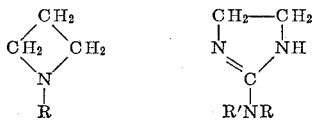

compounds of the formula

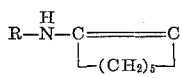

R=hydrocarbon heterocyclic, etc.

Oxyalkylated amines of the type $HO(AO)_nANH_2$, $NH_2(AO)_nANH_2$, where A is alkylene (ethylene, propylene, butylene) and $n$ is a number for example 1–100 or higher for example $HO(EtO)_nEtNH_2$, $NH_2(EtO)_nEtNH_2$.

A wide variety of amines have been disclosed herein. Any amine capable of forming an inorganic-amine salt of the oxyacid can be employed. As is quite evident, many other amines are now known and many more amines will be developed in the future. It is therefore impossible to attempt a comprehensive catalogue of all amines. However, sufficient examples have been presented herein to illustrate the wide variety of amines capable of being employed herein and to present representative examples thereof. The choice of a specific amine will depend on properties one desires in the final product, such as to solubility, use, etc.

OXYALKYLATED AMINES

Also included within the scope of this invention are hydroxylamines, oxyalkylated amines, etc. For example, oxyalkylated ammonia or amines where one or more alkylene oxide units are added thereto. Examples include $$H_2N-CH_2CH_2OH$$

$$HN=(CH_2CH_2OH)_2$$

$$N\equiv(CH_2CH_2OH)_3$$

Any oxyalkylated derivatives of oxyalkylatable mono-, poly-, cyclic-, heterocyclic-, etc. amines can be oxyalkylated according to this invention to place $(OA)_a$ units therein, where OA represents the alkylene oxide derived radical of a unit where $a$ can be for example 1–100, such as 1–50, for example 1–20, but preferably 1–10.

Oxyalkylated amines may be represented by the formula

where Ⓝ represents the amine moiety which originally contained at least one oxyalkylatable group (monoamines, polyamines, heterocyclic amines, etc.) and $(OA)_a$ has the meaning stated above. Oxyalkylation may take place at one or more positions determined by the number of oxyalkylatable positions.

Thus, any of the oxyalkylatable amines disclosed herein and elsewhere can be oxyalkylated and employed in this invention.

$(OA)_n$ is derived from any suitable $\alpha,\beta$ alkylene oxide, for example, alkylene oxides of the formula

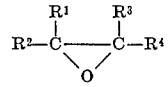

where $R^1$, $R^2$, $R^3$, $R^4$ are hydrogen or a substituted group, for example alkyl, cycloalkyl, aryl, etc., for example ethylene oxide, propylene oxide, butylene oxide, amylene oxide, octylene oxide, styrene oxide, methylstyrene oxide, cyclohexene oxide (where $R^1$ and $R^3$ are joined to form a ring), etc.

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

$(OA)_n$ denotes (1) homo units for example $-(OEt)_a$, $-(OPr)_n-$, $-(OBu)_n-$, $-(O\ Octyl)_n-$,

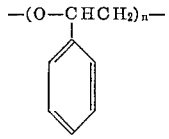

etc., (2) block units, $-(OEt)_a(OPr)_b-$,
$-(OEt)_a(OBu)_b-$, $(OPr)_a(OEt)_b(OPr)_c$
$(OEt)_a(OPr)_b(OBu)_c$,

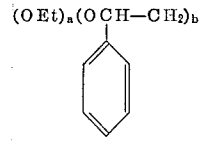

etc.
where $a+b+c=n$; (3) hereto units containing group which are random mixtures of more than one oxide $(OEt-OPr)_n$, $(OPr-OBu)_n$, $(OEt-OBu)_n$, wherein the ratio of each oxide to the other is for example 1–99 to 99–1; (4) hetero-homo units for example
$(EtO)_a(EtC-PrO)_b, (EtO)_a(PrO)_b(EtO-$
$PrO)_c$, $(EtO-PrO)_a(BuO)_b$
etc.

In addition, $(OA)_n$ can be derived from oxetanes (e.g. $\alpha$-$\gamma$ alkylene oxides) for example those of the formula

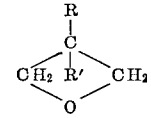

where R and R' are hydrogen or a substituted radical for example alkyl, aryl, cycloalkyl, alkenyl, aralkyl, etc.

In addition, R and R' can be substituted as in cases when the oxetane is derived from pentaerythritol and derivatives thereof. Examples of such oxetanes can be found in the American Chemical Society Monogram "The Pentaerythritols" by Berlow et al. (Reinhold 1958) Chapter X. Preferred embodiments of such pentaerythritol derived oxetanes are those of the formula

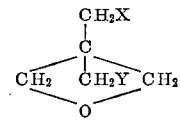

where X and Y are halogen, cyano, hydroxy and alkoxy.

The following examples are presented by way of illustration and not of limitation.

Example 1

To a clear solution of 10.4 g. of sodium bisulfite (0.1 mole) dissolved in 31.9 g. of water was added with stirring 21.5 g. of dimethyl dodecyl amine, Armeen DM12D (0.1 mole). The reaction was exothermic. The resulting solution was clear and thick, and exhibited strong foaming action.

Example 2

13.6 g. of potassium dihydrogen phosphate (0.1 mole) was dissolved in 35.1 g. of water with some warming. To this clear aqueous solution was added 21.5 g. of Armeen DM12D (0.1 mole) with stirring causing an exothermic reaction. After addition, the reaction mixture was heated until a clear, thick foaming solution was obtained.

Example 3

To a clear aqueous solution of 13.8 g. of sodium bisulfate (0.1 mole) dissolved in 35.3 g. of water was added with stirring 21.5 g. of Armeen DM12D (0.1 mole). The solution became very thick during the addition. Heating was applied, after the completion of addition, until the solution became clear.

Example 4

To a clear aqueous solution of 5.2 g. of sodium bisulfite (0.05 mole) dissolved in 20 g. of water was added 14.8 g. of an imidazoline amine (0.05 mole) derived from lauric acid and dipropylene triamine with stirring. After addition, a clear, yellowish solution was obtained.

Example 5

5.2 g. of sodium bisulfate (0.05 mole) was dissolved in 25.2 g. of water. To this aqueous solution was added 7.4 g. of an imidazoline amine (0.025 mole) derived from dipropylene triamine and lauric acid. A clear, foamy solution was obtained.

Further examples similarly prepared are tabulated below:

TABLE IX

| Ex. | Inorganic Oxyacid Salt | Moles | Amine | Moles |
|---|---|---|---|---|
| 6 | $NaHSO_3$ | 1 | $CH_3-N(CH_3)-C_{16}H_{33}$ | 1 |
| 7 | $NaHSO_3$ | 2 | Piperazine (N(CH$_2$CH$_2$)$_2$N with CH$_2$-CH$_2$ bridges) | 1 |
| 8 | $NaHSO_3$ | 1 | $CH_3-CH(NH)CH_2$ (propyleneimine) | 1 |
| 9 | $NaHSO_3$ | 1 | $CH_2(NH)CH_2$ (ethyleneimine) | 1 |
| 10 | $NaHSO_3$ | 1 | Polyethylene glycol amine 1000 $HO(EtO)_nEtNH_2$ | 1 |
| 11 | $KH_2PO_4$ | 1 | ...do... | 1 |
| 12 | $KH_2PO_4$ | 1 | Polypropylene glycol amine 1000 $HO(PrO)_nPrNH_2$ | 1 |
| 13 | $NaHSO_3$ | 1 | Imidazoline: $CH_3$-CH-CH$_2$ ring with N=C($C_{15}H_{31}$)-N-CH$_2$-CH($CH_3$)NH$_2$ | 1 |
| 14 | $KH_2PO_4$ | 1 | Imidazoline: $CH_3$-CH-CH$_2$ ring with N=C($C_{15}H_{31}$)-N-CH$_2$-CH($CH_3$)NH$_2$ | 1 |
| 15 | $NaHSO_4$ | 1 | Imidazoline: CH$_2$-CH$_2$ ring with N=C($C_{17}H_{33}$)-N-CH$_2$CH$_2$OH | 1 |
| 16 | $NaHSO_3$ | 1 | Same as above | 1 |
| 17 | $KH_2PO_4$ | 1 | Same as above | 1 |
| 18 | $NaHSO_3$ | 2 | Imidazoline: $CH_3$-CH-CH$_2$ ring with N=C($C_{13}H_{27}$)-N-CH$_2$-CH($CH_3$)NH$_2$ | 1 |

TABLE IX—Continued

| Ex. | Inorganic Oxyacid Salt | Moles | Amine | Moles |
|---|---|---|---|---|
| 19 | $NaHSO_3$ | 1 | ![structure: imidazoline with CH(CH_3)-CH_2 ring, N-CH_2-CH_2NH_2 with CH_3, C_17H_33 substituent] | 1 |
|  |  | 1 | Same as above | 1 |
| 20 | $KH_2PO_4$ | 1 | ![structure: imidazoline with CH(CH_3)-CH_2 ring, N-CH_2-CH_2NH_2 with CH_3, C_17H_33 substituent] | 1 |
| 21 | $KH_2PO_4$ | 1 | ![structure: imidazoline CH_2-CH_2 ring, N-CH_2-CH_2NH_2, C_17H_35 substituent] | 1 |
| 22 | $NaHSO_4$ | 1 | ![structure: imidazoline CH_2-CH_2 ring, NH, C_11H_23 substituent] | 1 |
| 23 | $NaHSO_3$ | 3 | ![structure: imidazoline CH_2-CH_2 ring, N-CH_2CH_2NHCH_2CH_2NH_2, C_11H_23 substituent] | 1 |
| 24 | $NaHSO_3$ | 1 | ![structure: cyclohexane-fused tetrahydropyrimidine ring with N, NH, C(=N)-N-C_12H_25] | 1 |
| 25 | $NaHSO_3$ | 1 | Morpholine | 1 |
| 26 | $NaHSO_3$ | 1 | ![structure: tetrahydropyrimidine ring with N, N-CH_2CH_2CH_2NH_2, C_11H_23 substituent] | 1 |
| 27 | $NaHSO_3$ | 2 | Same as above | 1 |
| 28 | $NaHSO_3$ | 1 | $HOCH_2CH_2NHNH_2$ | 1 |
| 29 | $KH_2PO_4$ | 1 | ![structure: imidazoline CH_2-CH_2 ring, N, NH, NHC_12H_25 substituent] | 1 |
| 30 | $NaHSO_3$ | 2 | ![structure: bis-imidazoline linked by NH-(CH_2)_6-NH] | 1 |
| 31 | $KH_2PO_4$ | 2 | Same as above | 1 |
| 32 | $NaHSO_3$ | 1 | ![structure: succinimide-type ring, $C_8H_{15}-CH_2-C(=O)$, $CH_2-C(=O)$, N-CH_2CH_2NH_2] | 1 |

TABLE IX—Continued
| Ex. | Inorganic Oxyacid Salt | Moles | Amine | Moles |
|---|---|---|---|---|
| 33 | $KH_2PO_4$ | 1 | 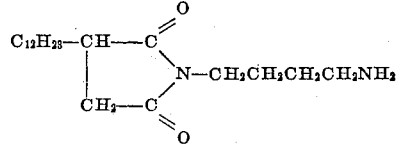 | 1 |
| 34 | $NaHSO_3$ | 1 | 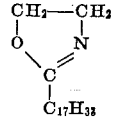 | 1 |
| 35 | $NaHSO_3$ | 1 | 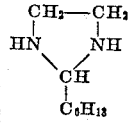 | 1 |
| 36 | $NaHSO_4$ | 2 | 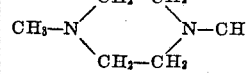 | 1 |
| 37 | $NaHSO_3$ | 2 | Duomeen O | 1 |
| 38 | $KH_2PO_4$ | 1 | Duomeen C | 1 |
| 39 | $NaHSO_3$ | 2 | 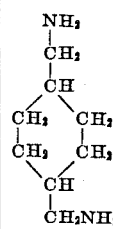 | 1 |
| 40 | $NaHSO_3$ | 1 | $HOCH_2-\underset{\underset{NH_2}{\mid}}{C}-CH_2OH$ with $CH_2OH$ | 1 |
| 41 | $NaHSO_3$ | 1 | $C_{12}H_{25}NH_2$ | 1 |
| 42 | $NaHSO_3$ | 1 | 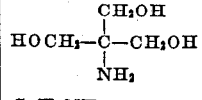 | 1 |
| 43 | $KH_2PO_4$ | 2 | 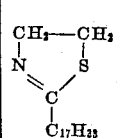 | 1 |
| 44 | $NaHSO_3$ | 1 | 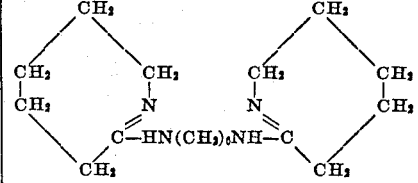 | 1 |
| 45 | $KH_2PO_4$ | 1 | 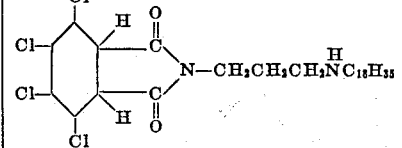 | 1 |

USES

This invention also relates to methods of using these products, which have an unexpectedly broad spectrum of uses, for example, as demulsifiers particularly for oil-in-water emulsions; as corrosion inhibitors; as flocculants; as scale preventatives; as chelating agents or to form chelates which are themselves useful, for example, as anti-oxidants, fungicides; etc.; as flotation agents, for example, as flotation collection agents; as additives for compositions useful in acidizing calcareous stratas of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for drilling muds; as foaming agents such as foamers employed in air drilling, as agents useful in removing mud sheaths from newly drilled wells; as dehazing or "fog-inhibiting" agents for fuels; as deicing agents for fuels; as antiseptic, preservative, bactericidal, bacteriostatic, germicidal, fungicidal agents; as agents for the textile industry, as wetting agents, as dispersing agents, as detergents, as penetrating agents, as softening agents, as dyeing assistants, as anti-static agents, and the like; as detergents useful in metal cleaners, in general cleaning, and the like; as agents useful in leather processes; as agents in metal pickling; as antifeathering agents in ink; as agents in the preparation of wood pulp and pulp slurries, as emulsifiers for insecticidal compositions and agricultural sprays such as DDT, 24-D (Toxaphene), chlordane, nicotine sulfate, hexachloracyclohexane, and the like.

The above are non-limiting examples of suitable uses for these compositions.

Having thus described my invention, what I claim as new and desire to obtain by Letters Patent is

1. The inorganic amine salt consisting of the reaction product formed by reacting (1) an alkali metal salt of phosphorous acid, phosphoric acid, sulfurous acid or sulfuric acid and (2) dimethyl dodecyl amine.

2. The inorganic amine salt of claim 1 wherein the alkali metal salt is sodium bisulfite.

3. The inorganic amine salt of claim 1 wherein the alkali metal salt is sodium bisulfate.

4. The inorganic amine salt of claim 1 wherein the alkali metal salt is potassium dihydrogen phosphate.

References Cited by the Examiner

UNITED STATES PATENTS

| | | | |
|---|---|---|---|
| 1,701,265 | 2/1929 | Hofmann | 23—105 |
| 1,836,047 | 12/1931 | Somerville | 260—583 |
| 1,860,560 | 5/1932 | Warburton | 260—579 |
| 2,118,674 | 5/1938 | Herold et al. | 260—583 |
| 3,068,288 | 12/1962 | Godefroi | 260—579 |
| 3,160,657 | 12/1964 | Price et al. | 260—583 X |

OTHER REFERENCES

Beilsteins: Handbuch der Organischen Chemie, vol. 4 (Berlin, 1922), pp. 37–38 and 91–92.

Conney et al.: Jour. Pharm. Exper. Therap., vol. 128, pp. 333–39 (1960).

Cooper et al.: Jour. Pharm. Exper. Therap., vol. 114, pp. 409–410 (1955).

Hawk et al.: Practical Physiological Chemistry, 13th ed., pp. 35–37, N.Y., Blakeston, 1954.

Mark et al.: Jour. Pharm. Exper. Therap., vol. 123, pp. 70–73 (1958).

Merck Index, 7th ed., pp. 119, 403, 405, 639, 783, 794, 853, 888, and 1051, Rahway, Merck, 1960.

Moeller; Inorganic Chemistry (New York, 1952), p. 533–541, and 639–648.

Schanker et al.: Jour. Pharm. Exper. Therap., vol. 123, pp. 81–87 (1958).

The Dispensatory of the United States of America, 23rd ed., p. 1521, Philadelphia, Lippencott, 1943.

CHARLES B. PARKER, *Primary Examiner.*

W. MODANCE, N. S. RIZZO *Examiners.*

R. L. RAYMOND, N. TROUSOF, A. D. ROLLINS,
*Assistant Examiners.*